Patented June 20, 1950

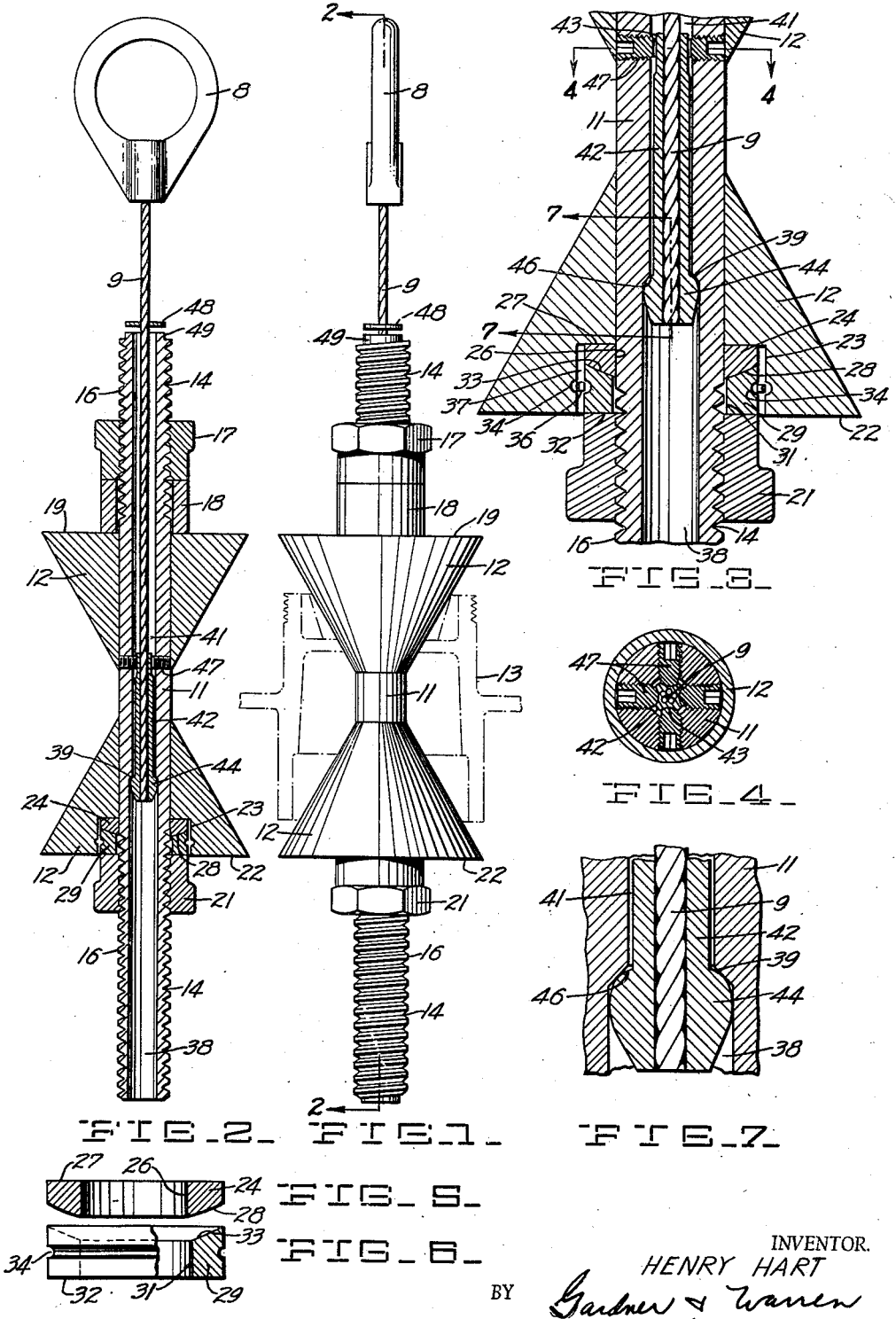

2,512,231

UNITED STATES PATENT OFFICE 2,512,231

BALANCING APPARATUS

Henry Hart, Oakland, Calif.

Application September 29, 1945, Serial No. 619,318

4 Claims. (Cl. 73—66)

This invention relates to apparatus for effecting gyratory balance in wheels or the like rotary elements.

It is an object of the invention to provide, in wheel balancing apparatus of the pendant static type, improved and simple means for effecting axial coincidence between the part under test and a true vertical axis.

Another object of the invention is to provide, in apparatus of the character described, simple means for clearly indicating the radial location of an overbalancing mass in the object under test.

A further object of the invention is to provide, in apparatus of the type above described, means for adjusting the angle of repose of a pendant member to make said angle, register with a true vertical axis and for maintaining said adjustment thereafter.

Still another object of my invention is to provide, in apparatus of the class referred to, adjustment means, for balancing the apparatus, which is concealed and not liable to disturbance or damage during the course of normal use of the apparatus.

A still further object of the invention is to provide construction, in a pendant type balancer, wherein the degree of functional precision in the device may be maintained at the highest order.

Other objects and features of value will appear as the detailed description of the invention, hereunto annexed, proceeds. It is to be understood that the invention is not to be limited to the specific form thereof herein shown and described as various other embodiments thereof may be employed within the scope of the appended claims.

Referring to the drawing:

Figure 1 is a side elevational view of a balancing apparatus incorporating the improvements of my invention and indicating, in dot-dash lines, the operative position thereof relative to an object under test.

Figure 2 is a vertical sectional view taken in the plane indicated by the line 2—2 of Figure 1.

Figure 3 is a fragmental vertical sectional view, to an enlarged scale and similar to portions of Figure 2, showing the angular alignment apparatus.

Figure 4 is a horizontal sectional view taken in the plane indicated by the line 4—4 of Figure 3.

Figure 5 is a vertical sectional view of one of the centralizing washers, the scale being enlarged over that of the similar structure of Figure 2.

Figure 6 is an enlarged view, partly in side elevation and partly in vertical section, of the other centralizing washer.

Figure 7 is an enlarged vertical sectional view showing the pivotal mounting for the sleeve. The plane in which the view is taken is indicated by the line 7—7 of Figure 3.

In the drawing, Figure 1 fully illustrates a pendant type of balancer in which an eye 8, or other such member, is provided and which is adapted to be supported from an associated elevated structure. The eye 8 is affixed to the upper end of a length of flexible metallic cable 9, the lower end of the cable being anchored, in a particular manner to be explained later, substantially medially of and within a vertically disposed tubular stem 11. Suitable chuck members 12, illustrated in the drawing as frusto-conical collars, are arranged concentric with and for slidable displacement relative to the stem 11 for the purpose of gripping and centering the object to be balanced, the latter in this case being illustrated as the hub 13 of a vehicle wheel. In operation, at least that portion of the cable 9 extending from the eye 8 to the upper end of the stem 11 will assume a truly vertical position. However, due to radial dissymmetry or eccentric weight distribution in the object under test, the stem 11 will assume an axially angular position, with respect to the vertical portion of the cable, in proportion to the severity of unbalance in the object. Proper balance in the object is then achieved by removing sufficient of the overbalancing weight mass from the object to bring the axis of the stem 11 into exact coaxial alignment with the axis of the originally vertical portion of the cable. Such alignment may be approximated by observing the position of the cable relative to the stem bore at the point of entrance of the cable into the bore.

It is obvious that unless the stem and its component parts are each and all symmetrical and axially aligned and exactly centered with respect to the axis of the supporting cable, the value of the device as balancing apparatus will be nullified since even a slight unbalancing of the pendant elements will be reflected in the ultimate degree of balance established in the object under test. I have provided improved construction in the type of balancer above described which will eliminate from the apparatus even the most minute degree of relative displacement between the co-functioning parts, thus rendering the apparatus capable of effecting balance corrections which very closely approach perfection. The most important factor in the design of a precision pendant-type balancer, outside of making all parts symmetrical and therefore self-balancing, is to very accurately register all of the parts so that they are in absolute concentricity and coaxial alignment. In accomplishing this, the outside diameter of the stem 11 is accurately sized and the fit of the stem in the bores of the cone-shaped chuck members is such that only sufficient clearance is allowed to permit the latter to slide on the stem. Care is also exercised in applying pressure to the chuck members in such a manner that eccentric stressing of the members may not occur and the pressure-applying means is arranged to be kept constantly concentric with the stem. Formed at each end of the stem are threads 14 differing from standard form threads only in that they are not cut full-depth in relation to their pitch. This provides flats 16 of considerable width, between adjacent thread grooves, the diameter of the flat portion of the threads being identical with that of the unthreaded portion of the stem. The pressure-applying and locking means for the uppermost chuck member 12 comprises a nut 17, engaging the upper threads 14, having a collar 18 interposed between its lower face and the upper face 19 of the chuck member. Equally as close a fit exists between the periphery of the stem and the bore of the collar 18 as that between the stem and chuck member, and the major diameter of the internal threads in the nut 17 is such that a similar close fit exists in the nut thread. Thus the nut and collar are fitted as closely as machining limits will permit which insure optimum concentricity of the pressure and locking elements. A similar nut 21 is provided for the lower chuck member but the washer structure is modified somewhat. The lower chuck member is provided in its bottom surface 22 with a counterbore 23 in which the sectional washer, best shown in Figures 5 and 6 may be received. The latter washer comprises an upper section 24 provided with a bore 26 snugly fitting the stem 11 and having an upper planar face 27, engaging the bottom of the counterbore, and a lower spheroidal surface 28 which is generated about a focus situated substantially medially of the length, and on the axis, of the stem. The lower section 29 has a somewhat enlarged central bore 31, which permits limited radial movement of the washer relative to the stem, a lower plane surface 32 against which the upper end of the lower nut 21 bears, and an upper frusto-conical recess 33 whose radial cross-sectional form is campanulate and engaged by the spheroidal surface of the upper washer section thus providing an annular line contact between the two washer sections. Due to the fact that the lower chuck member 12 must bear the full vertical load of the object under test, which in some cases may be considerable, and due to the fact that certain pitch inequalities may exist between the threads of the stem and nut 21 it is possible that a slight angular displacement of the nut relative to the stem may occur which, if the lower chuck member were allowed to bear directly on the nut, might be imparted to the chuck member, in the form of eccentric pressure application, and thence to the object under test. The provision of the self-aligning washer structure precludes the possibility of distortion transmission from the nut 21 to the other parts of the apparatus.

In order to mount the object under test on the balancing apparatus, and to later remove it, the nut 21 and the lower chuck member 12 must be removed and replaced. To obviate the bother of handling the extra loose pieces comprising the washer 24—29 and to remove the danger of losing these pieces, provision is made to lock the washer assembly in the counterbore 23 in such a manner that free movement of the washer parts is not interfered with. This is accomplished by providing both the perimeters of the counterbore and lower washer section with grooves 34 registered to form an annular pocket into which a ring 36 of spring metal may be snapped by insertion of the latter into the peripheral gap 37 existing between the washer sections and the counterbore. The ring 36 is shaped so that it has a peripheral sinusoidal contour, alternate lobes of which project into the respective grooves 34. It will be seen that this structure secures the washer sections and the lower chuck member together as an integral unit and reduces to a minimum the number of parts it is necessary to handle each time that a wheel or other object is to be mounted on or dismounted from the balancing apparatus.

Means is provided for accurately centering the cable 9 with respect to the axis of the stem 11. Extending upwardly into the stem 11 from the lower end thereof is a counterbore 38 terminating at its upper end, as is best shown in Figure 8, in an annular seat 39 which, like the recess 33, is campanulate in cross-sectional aspect. Disposed within the stem bore 41 is a tubular sleeve 42 centrally bored to snugly receive the lower end of the cable 9, the latter being secured in place by swaging the upper end of the sleeve at the points 43 so as to collapse it about and to tightly grip the cable. The lower end of the sleeve 42 is provided with an enlarged head 44 having a peripheral spheroidal shoulder 46 confronting and bearing against the seat 39, the radial focus of the sleeve and the head being so proportioned so that the head 44 will snugly fit the counterbore 38 and will be free for slight rotary movement therein. The upper portion of the sleeve is slightly smaller in diameter than the bore of the stem so as to allow a limited rocking movement of the stem in the bore and a plurality, preferably four, of screws 47 tapped radially into and through the stem are positioned to bear against the upper end of the sleeve. The screws 47 provide for radial adjustment of the upper end of the sleeve within the stem bore so as to bring the axes of the latter and the cable 9 into exact coincidence. Thus the cable and the stem may be made to hang absolutely plumb.

Means is provided for indicating, during tests, any relative axial divergence which may be created between the cable and stem axes. Positioned immediately above the upper end of the stem 11, and provided with a central aperture through which the cable 9 snugly passes, is a circular disk indicator 48 which is adapted, when perfect alignment exists between the axes of the cable and stem, to exactly register with an extension 49 of identical diameter which is formed at the end of the stem. Even very slight degrees of eccentricity between the indicator 48 and the extension 49 will be visually apparent when a commensurate degree of unbalance exists in the object under test. The removal of weight mass from the object or the addition thereto of counterweights in the usual manner will bring the indicator and its cooperative extension into exact registry thus denoting the existence of optimum balance in the object.

Although I have chosen to illustrate my invention as incorporating a certain arrangement of parts and design, modifications in the structure and proportions may be made by those skilled in the art without departing from the spirit of the invention as set forth in the appended claims.

I claim:

1. In a balancing apparatus, a pendant member, a sleeve member surrounding said pendant member and having thereon relatively opposed chuck elements for engaging and supporting an object to be balanced, means carried by and longitudinally adjustable on said sleeve member for supporting one of said chuck elements and including a nut threadedly engaged with said sleeve member, a pair of washers interposed between said nut and one of said chuck elements and provided with coengaging substantially concave and convex surfaces, said pendant and sleeve members being interconnected whereby they may move between positions of axial coincidence and angularity, and means for variably positioning said members in selected positions of axial angularity relative to each other.

2. In a balancing apparatus, a pendant member, a sleeve member surrounding said pendant member and provided with relatively opposed chuck elements for engaging and supporting thereon an object to be balanced, means carried by and longitudinally adjustable on said sleeve member for supporting one of said chuck elements and including a nut threadedly engaged with said sleeve member, a pair of washers interposed between said nut and one of said chuck elements and provided with coengaging substantially concave and convex surfaces said pendant and sleeve members being interconnected whereby they may move between positions of axial coincidence and angularity, means for variably positioning said members in selected positions of axial angularity relative to each other, and means for indicating further degrees of relative axial angularity between said members.

3. In a balancing apparatus, a flexible pendant member, a tubular member concentric with and arranged for movement into axially angular positions relative to said pendant member, said tubular member having screw threads at each end thereof and being provided within the bore thereof with an annular bearing seat, a stem in the bore of said tubular member having at one end a spheroidally-shaped head rockably engaged with said annular seat and being attached at the other end to said pendant member, screws threadedly engaged in said tubular member and positioned radially thereof to engage said other end of the stem, said screws being adjustable so as to position said stem relative to the tubular member, an indicator carried by said pendant member and registrable with an end of said tubular member to indicate relative degrees of angularity between the members, upper and lower chuck members slidable on said tubular member and provided with relatively confronting faces engageable with and to support an object to be balanced, nuts carried by the threads of said tubular member, a unit washer interposed between a nut and the upper chuck member, and a split washer interposed between a nut and the lower chuck member, comprising upper and lower sections having confronting engaged surfaces, one of said surfaces being substantially in a form of a frusto-conical recess.

4. In a balancing apparatus, a flexible pendant member, a tubular member concentric with and arranged for movement into axially angular positions relative to said pendant member, said tubular member having screw threads at each end thereof and being provided within the bore thereof with an annular bearing seat, a stem in the bore of said tubular member having at one end a spheroidally-shaped head rockably engaged with said annular seat and being attached at the other end to said pendant member, screws threadedly engaged in said tubular member and positioned radially thereof to engage said other end of the stem, said screws being adjustable so as to position said stem relative to the tubular member, an indicator carried by said pendant member and registrable with an end of said tubular member to indicate relative degrees of angularity between the members, upper and lower chuck members slidable on said tubular member and provided with relatively confronting faces engageable with and to support an object to be balanced, said lower chuck member having a counterbore extending into the lower end thereof in axial concentricity with said tubular member, an upper nut carried by the threads at the upper end of said tubular member, a unit washer interposed between said upper nut and the upper face of the upper chuck member, a lower nut carried by the threads at the lower end of said tubular member, a split washer interposed between said lower nut and a surface of the lower chuck member within said counterbore thereof and comprising a pair of ring-shaped members concentric with said tubular member and having confronting, engaged, substantially complementary surfaces, one of said surfaces comprising a frusto-conical recess and the other of said surfaces being of spheroidal form, one of said ring-shaped members and the peripheral surface of said counterbore being provided with relatively registered grooves, and a retainer ring connecting said one of the ring-shaped members and said lower chuck member, said retainer ring having a peripherally sinusoidal contour, the alternate lobes of which extend into the respective grooves of said one of the ring-shaped members and the said lower chuck member.

HENRY HART.

REFERENCES CITED

The following references are of record in the file of this patent:

UNITED STATES PATENTS

| Number | Name | Date |
|---|---|---|
| D. 141,990 | Butler | Aug. 7, 1945 |
| 2,039,211 | Caldwell | Apr. 28, 1936 |
| 2,172,006 | Buckner et al. | Sept. 5, 1939 |
| 2,377,045 | Sharp | May 29, 1945 |

FOREIGN PATENTS

| Number | Country | Date |
|---|---|---|
| 114,195 | Great Britain | Mar. 21, 1918 |